US012712099B2

(12) United States Patent
Palmer

(10) Patent No.: US 12,712,099 B2
(45) Date of Patent: Aug. 18, 2026

(54) INSULATOR SUPPORT PINS

(71) Applicant: PREFORMED LINE PRODUCTS CO., Mayfield Village, OH (US)

(72) Inventor: Jacob Palmer, Chesterland, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 1102 days.

(21) Appl. No.: 17/486,763

(22) Filed: Sep. 27, 2021

(65) Prior Publication Data

US 2023/0097482 A1 Mar. 30, 2023

(51) Int. Cl.
*H01B 17/20* (2006.01)
*H01B 17/24* (2006.01)

(52) U.S. Cl.
CPC ............. *H01B 17/20* (2013.01); *H01B 17/24* (2013.01)

(58) Field of Classification Search
CPC ................................ H01B 17/20; H01B 17/24
See application file for complete search history.

(56) References Cited

U.S. PATENT DOCUMENTS 1,069,782 A * 8/1913 Hilliard .................. H01B 17/44 174/169
1,174,607 A * 3/1916 Peirce, Jr. .............. H01B 17/20 248/226.12
1,202,418 A * 10/1916 Peirce, Jr. .............. H01B 17/16 174/200
1,219,862 A * 3/1917 Peirce, Jr. .............. H01B 17/20 174/203
1,694,415 A * 12/1928 Gordon .................. H01B 17/20 174/174
1,696,861 A * 12/1928 Plimpton ............... H01B 17/20 248/226.12
1,854,459 A * 4/1932 Dienner ................. H01B 17/52 174/211
2,266,400 A * 12/1941 Reed ...................... H01B 17/20 174/174
2,546,312 A * 3/1951 Larymore .............. H01B 17/20 411/509
2,947,802 A * 8/1960 Wortmann ............. H01B 17/20 174/206
4,047,279 A * 9/1977 Pettit ........................ H02G 1/02 174/165
4,174,464 A * 11/1979 Kawaguchi ............ H01B 17/42 174/211
4,476,155 A * 10/1984 Niemi ..................... C08L 83/04 252/573
4,749,824 A * 6/1988 Orbeck .................. H01B 17/42 524/588
4,803,311 A * 2/1989 Moriya .................. H01B 17/08 174/196
5,413,443 A * 5/1995 Aghamehdi ........... H01B 17/20 411/908
(Continued)

*Primary Examiner* — Timothy J Thompson
*Assistant Examiner* — Rhadames Alonzo Miller
(74) *Attorney, Agent, or Firm* — Cooper Legal Group, LLC

(57) ABSTRACT

An insulator support pin includes a strength member and a non-conductive sheath surrounding the strength member. The non-conductive sheath extends between a first end and a second end. The insulator support pin also includes a support member between the first end and the second end. The first end is configured to attach to an insulator, and the second end is configured to attach to a support structure.

20 Claims, 12 Drawing Sheets

(56) References Cited

U.S. PATENT DOCUMENTS

| | | | | | |
|---|---|---|---|---|---|
| 5,942,731 | A * | 8/1999 | Rogerson | H01B 17/20 | 411/902 |
| 5,945,636 | A * | 8/1999 | Sakich | H01B 17/20 | 174/209 |
| 7,154,036 | B2 * | 12/2006 | Lynch | H02G 7/00 | 174/138 F |
| 7,839,256 | B2 * | 11/2010 | Bradford | H01H 31/127 | 337/186 |
| 8,618,412 | B2 * | 12/2013 | Lynch | H01B 17/00 | 119/713 |
| 8,772,633 | B2 * | 7/2014 | Behnken | H01B 19/00 | 174/138 R |
| 8,957,314 | B2 * | 2/2015 | Niles | H02G 7/00 | 174/172 |
| 10,881,097 | B2 * | 1/2021 | Lynch | H01B 17/56 | |
| 10,958,046 | B2 * | 3/2021 | Lynch | H02B 1/06 | |
| 2002/0100605 | A1 * | 8/2002 | Ramarge | H01B 17/50 | 174/137 A |
| 2005/0034892 | A1 * | 2/2005 | Philips | H01B 17/325 | 174/137 A |
| 2005/0269127 | A1 * | 12/2005 | Mitchell | H01B 17/325 | 174/140 C |
| 2006/0003622 | A1 * | 1/2006 | Lynch | H02G 7/00 | 439/404 |
| 2006/0157268 | A1 * | 7/2006 | Youn | H01B 19/04 | 174/141 R |
| 2007/0102783 | A1 * | 5/2007 | Waters | H01B 17/42 | 257/510 |
| 2008/0128163 | A1 * | 6/2008 | Bradford | H01H 85/25 | 174/5 R |
| 2009/0071684 | A1 * | 3/2009 | Zhang | H02G 15/064 | 174/73.1 |
| 2010/0218988 | A1 * | 9/2010 | Lynch | H02G 7/00 | 174/5 R |
| 2011/0147049 | A1 * | 6/2011 | Ancilotto | H01B 17/20 | 174/209 |
| 2012/0193124 | A1 * | 8/2012 | Simnacher | H02G 1/02 | 174/137 R |
| 2012/0205139 | A1 * | 8/2012 | Cotton | H01B 17/12 | 174/162 |
| 2013/0299230 | A1 * | 11/2013 | Lynch | H01B 17/00 | 174/5 R |
| 2013/0306368 | A1 * | 11/2013 | Eriksson | H01B 17/005 | 174/650 |
| 2014/0054063 | A1 * | 2/2014 | George | H01B 19/04 | 264/259 |
| 2015/0114678 | A1 * | 4/2015 | Lynch | H02G 7/00 | 29/887 |
| 2018/0102205 | A1 * | 4/2018 | Sjöberg | H01B 17/30 | |
| 2020/0373041 | A1 * | 11/2020 | O'Regan | H01B 17/24 | |
| 2022/0413241 | A1 * | 12/2022 | Baker | G02B 6/483 | |

* cited by examiner

INSULATOR SUPPORT PINS

TECHNICAL FIELD

The instant application is generally directed toward insulator support pins for electrical distribution networks. More specifically, the instant application is directed toward insulator support pins for electrical distribution networks that reduce or eliminate passage of leakage current from suspended electrical conductors to combustible members supporting the insulator support pins.

BACKGROUND

Some insulator support pins are metallic, and as such, act as good conductors. As contamination falls upon the insulator, dry conductive bands form which allows for leakage current to flow or pass down the insulator to the pin. This leakage current or stray current then passes through a support member such as a combustible crossarm to a through-bolt. As the leakage current from each phase passes through the through-bolt, it can heat and dry the combustible crossarm. This heating and drying process can lead to ignition of the combustible crossarm.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, an insulator support pin includes a strength member and a non-conductive sheath surrounding the strength member. The non-conductive sheath extends between a first end and a second end. The insulator support pin also includes a support member between the first end and the second end. The first end is configured to attach to an insulator, and the second end is configured to attach to a support structure.

According to an aspect, an insulator support pin includes a strength member and a non-conductive sheath surrounding the strength member. The non-conductive sheath extends between a first end and a second end. The first end is configured to attach to an insulator, and the second end is configured to attach to a support structure. At a first location between the first end and the second end, the non-conductive sheath has a first mating portion. At a second location between the first end and the second end, the non-conductive sheath has a second mating portion. The first mating portion and the second mating portion mate with one another to couple a first portion of the non-conductive sheath to a second portion of the non-conductive sheath. The first portion of the non-conductive sheath extends between and includes the first end of the non-conductive sheath and the first mating portion. The second portion of the non-conductive sheath extends between and includes the second end of the non-conductive sheath and the second mating portion. When the first mating portion and the second mating portion are not mated with one another, the strength member is at least one of removable from or insertable into at least one of the first portion of the non-conductive sheath or the second portion of the non-conductive sheath.

According to an aspect, an insulator support pin includes a non-conductive strength member extending between a first end and a second end. The insulator support pin also includes at least one of a first attachment feature at the first end configured to attach to an insulator or a second attachment feature at the second end configured to attach to a support structure. The insulator support pin further includes a support member extending from at least one of the non-conductive strength member, the first attachment feature, or the second attachment feature.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
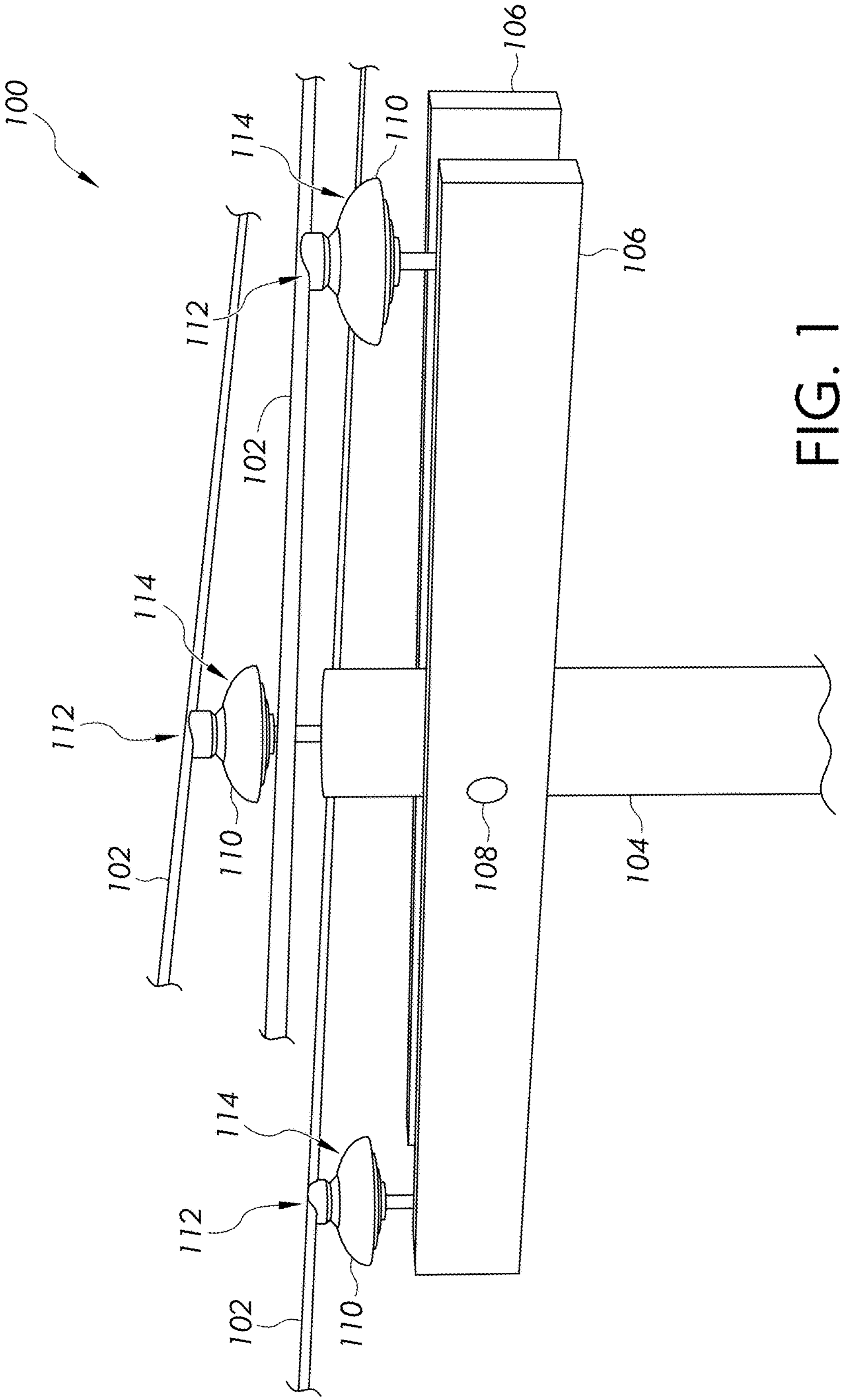
FIG. 1 illustrates an example insulator support pin located on a support member.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Electrical conductors (e.g., cables) are often supported above surfaces such as ground surfaces. In many examples, towers or poles include structures to suspend or support the electrical conductors above surfaces or "in the air." These towers, poles, or other similar structures can use wood cross arms to support insulators that, in turn, support the electrical conductors. The insulators are often supported by pins that include metal or metallic compositions that can promote electrical conductivity through or along the pin.

At times, the insulators described in this common scenario can collect airborne contamination on their surfaces, including, but not limited to: crystalized salt, fertilizer, and ash. These contaminants and others can form dry conductive bands enabling enough electrical conduction to enable a quantity of a leakage current to flow across the surface of the insulator to the pin. This undesired leakage current can then be conducted through moisture contained within the wood crossarm and passing to any other conductor such as a through-bolt that secures the crossarm to another structure. As the leakage current from each phase passes through the through-bolt (or other conductor), it can heat the wood crossarm and dry the wood crossarm, particularly in the crossarm volume surrounding the through-bolt. Eventually, the crossarm is sufficiently dried and heated to levels that can promote fire. Resulting fires can damage or destroy the supporting structure, the electrical conductors, surrounding vegetation, etc.

Referring now to the drawings, FIG. 1 is a perspective view of an electrical conductor support system 100. As noted previously, the electrical conductor support system 100 can support an electrical conductor 102 above a surface, such as a ground surface (not shown). Of course, the electrical conductor support system 100 can support the electrical conductor 102 above other surfaces such as buildings, bodies of water, etc. The electrical conductor support system 100 can include a vertical structure such as a pole 104 (e.g., a utility pole) which can be constructed of wood or any other suitable material. The pole 104 can support a crossarm 106 that can extend in one or more directions away from the pole 104. One or more crossarms 106 can be attached to the pole 104. The crossarm 106 can be constructed of any suitable material including, but not limited to, wood. The pole 104, the crossarm 106, and other shown structures can be referred to as support structures. In some examples, the crossarm 106 is fastened or attached to the pole with a through-bolt 108. In some examples, the through-bolt 108 is constructed of metal and can possess characteristics making the through-bolt a relatively good conductor of electricity.

In turn, the crossarm 106 can support an insulator 110. As shown in FIG. 1, the crossarm 106 and even the pole 104 can support one or more insulators 110. The insulators 110 typically possess characteristics making the insulators relatively poor conductors of electricity. As shown, the insulator 110 supports an electrical conductor 102 such that a series of structures (e.g., poles 104) can support a relatively long length of the electrical conductor 102 above the surface. The series of structures can be a portion of an electrical transmission system or an electrical distribution system that can transmit or distribute electrical power across great distances as needed.

Additionally, the shown insulator 110 supports the electrical conductor 102 merely by defining a groove 112 within the insulator surface 114 such that gravity maintains the electrical conductor 102 within the groove 112 for support above the surface. Of course, any suitable arrangement or method of securing the electrical conductor 102 to the insulator 110 is satisfactory. Furthermore, any suitable shape or type of insulator can be used with the apparatus and methods of the present disclosure, and the representation of the insulator 110 in the figures is not meant to be limiting.

Figure 2:
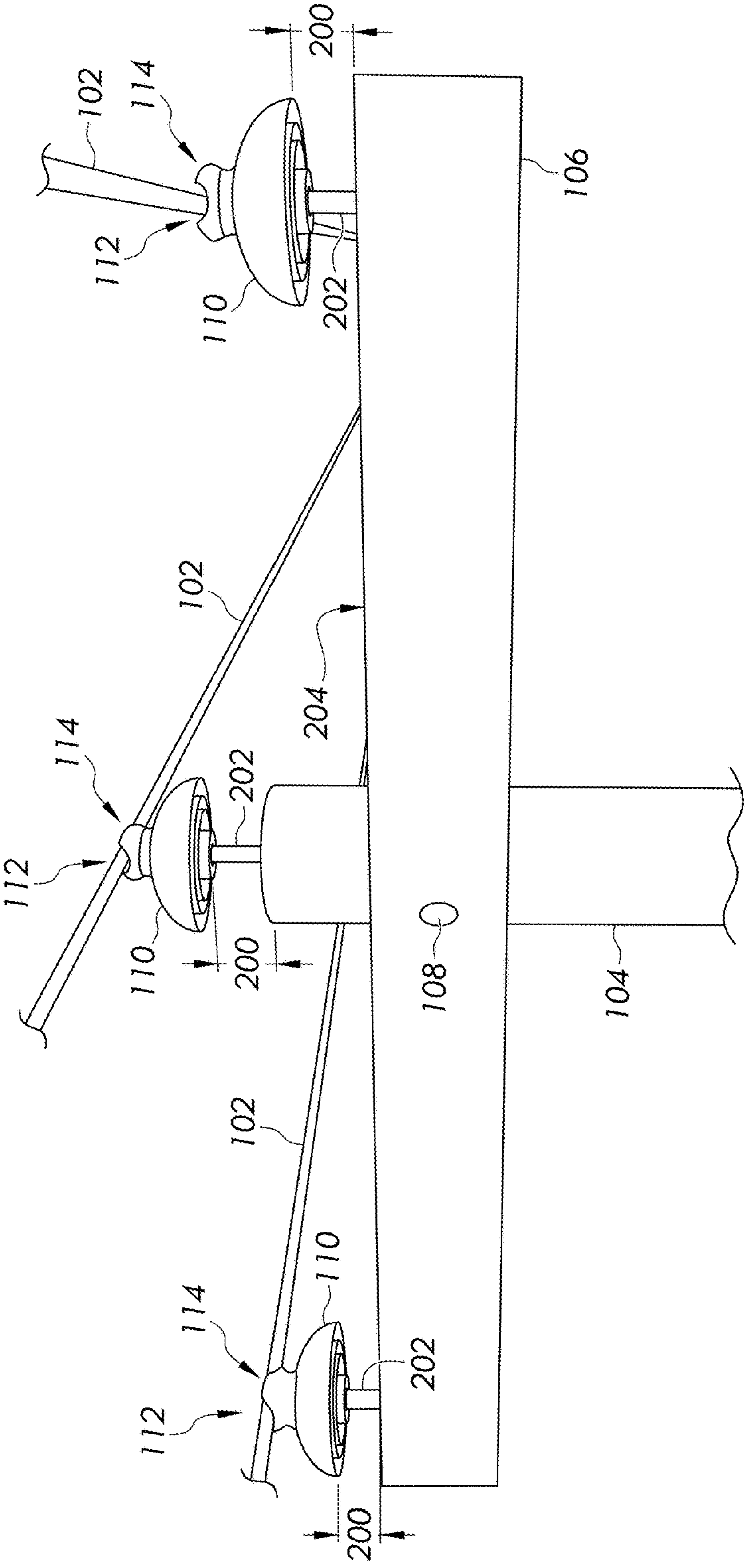
FIG. 2 illustrates an example insulator support pin located on a support member.

Referring to FIG. 2, a second view of the electrical conductor support system 100 is illustrated. As noted previously, the electrical conductor 102 can be placed within the groove 112 defined by the insulator surface 114. The insulator 110 can be supported a distance 200 from the crossarm 106 (or the pole 104) by an insulator support pin 202. The distance 200 can be properly calculated during a design/engineering process and set during an assembly process to help limit an amount of leakage current that may pass from the electrical conductor 102 to the crossarm 106 or the pole 104, or from the insulator 110 to the crossarm 106. In other words, the insulator support pin 202 can be engineered and manufactured to set a particular distance 200 that is calculated to reduce or eliminate the passage of leakage current from the insulator 110 to the crossarm 106 and from the insulator 110 to the pole 104. The distance 200 can also be calculated and designed to account for (e.g., minimize the effects of) a reduced magnitude of insulative properties of the insulator support pin 202 resulting from contamination accumulation on the insulator 110.

Figure 3:
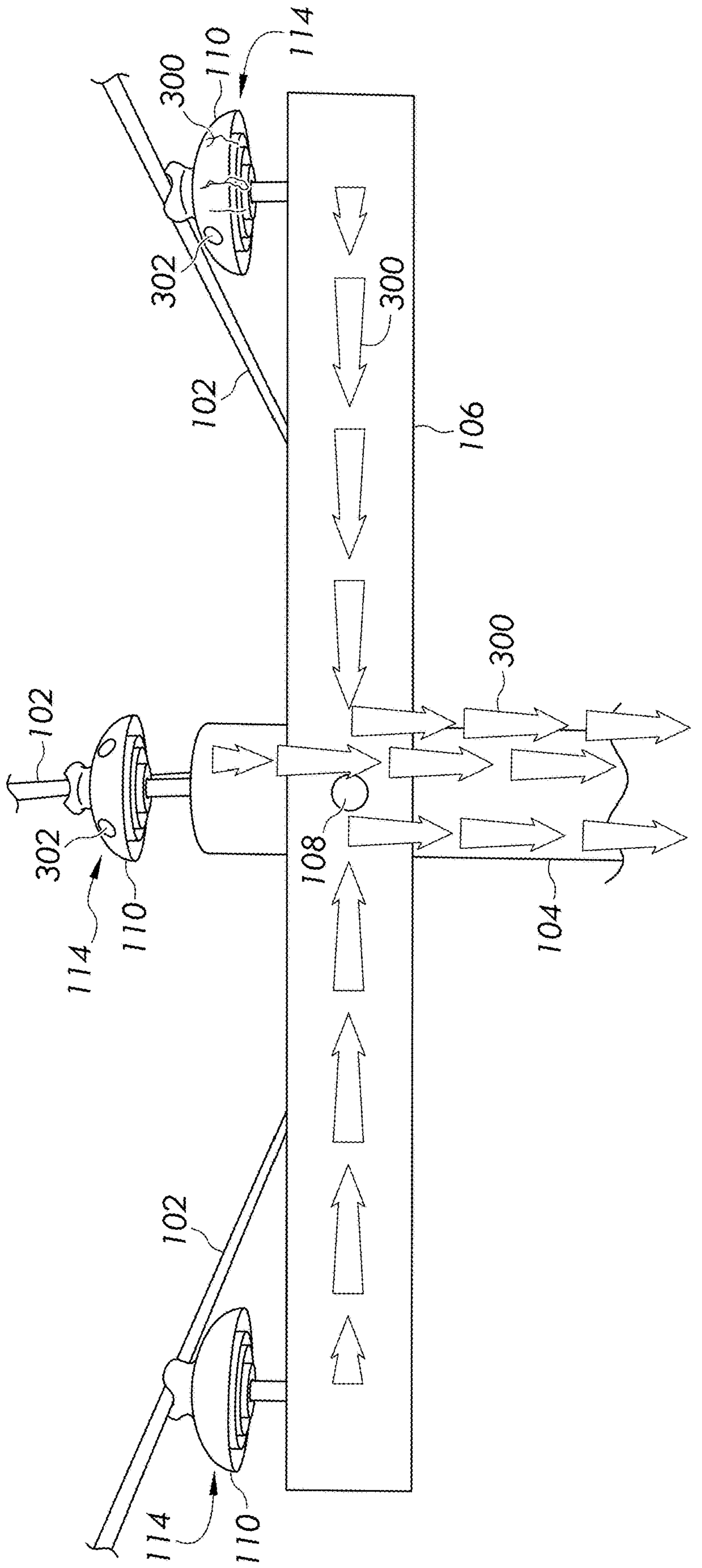
FIG. 3 illustrates an example insulator support pin located on a support member and example paths of leakage current.

Referring to FIG. 3, a schematic representation of the leakage current 300 is illustrated. The leakage current 300 can be conducted from the electrical conductor 102, through a quantity of contamination 302 on the insulator surface 114, through a pin (e.g., a support pin or rod) that may be electrically conductive. The leakage current 300 can than conduct toward the pole 104 via moisture that is on a surface of the crossarm 106 or within the crossarm 106. It is worthy of note that the leakage current 300 can pass by and potentially pass through the electrically conductive through-bolt 108. The leakage current 300 can also conduct down a surface or through the interior volume of the pole 104. As previously discussed, as the leakage current 300 from each phase of the electrical conductor 102 passes through the through-bolt 108 the leakage current 300 can heat the through-bolt 108 through resistance heating principles. When the through-bolt 108 is heated, the wood crossarm 106 is heated through at least one of conduction heat transfer or radiation heat transfer and, at the same time, removing an amount of moisture content within the wood crossarm 106. These heating and drying effects can be particularly prominent in a crossarm volume surrounding the through-bolt 108. Over time and at least one or more cycles of the described leakage current heating and drying cycle, the crossarm 106 can be sufficiently dried and heated to levels that can enable or promote fire. In other words, the crossarm 106 or the pole 104 can be more easily ignited than situations when the 106 crossarm or the pole 104 have not been dried and heated.

Figure 4:
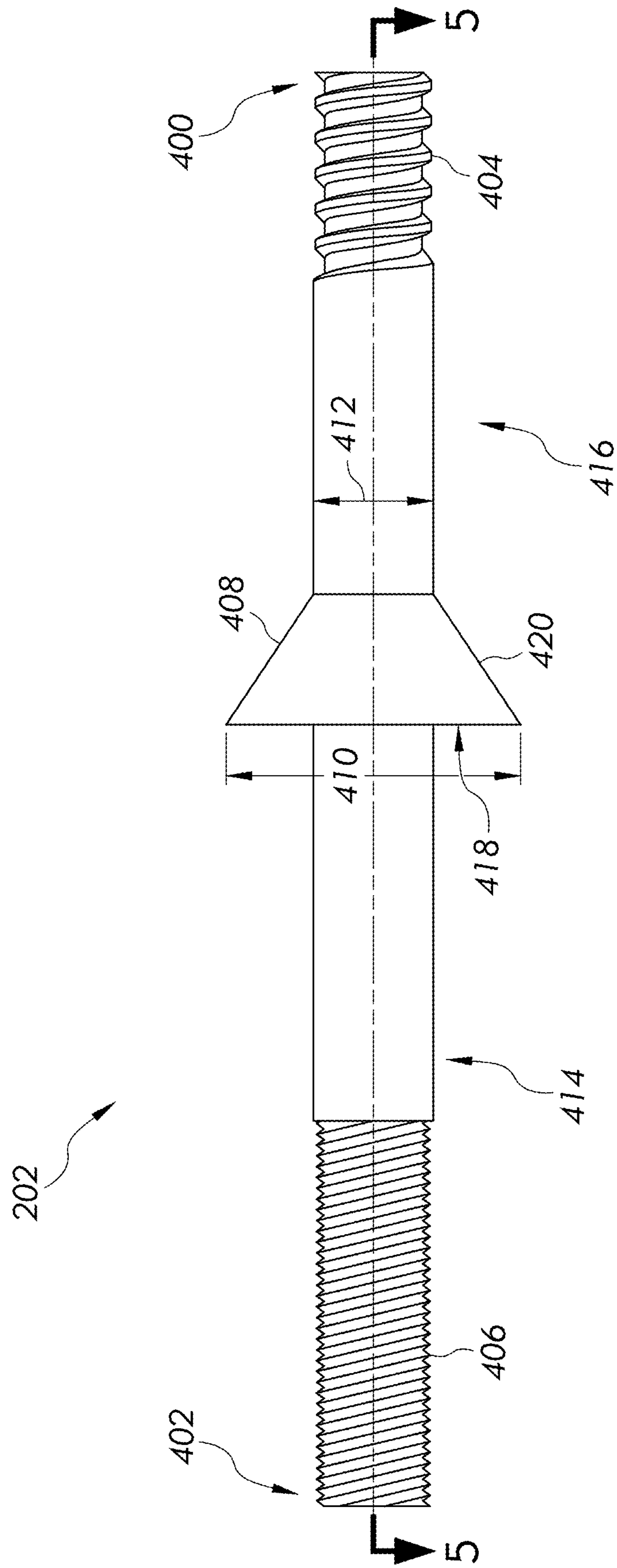
FIG. 4 is a detail view of an example insulator support pin.

Referring to FIG. 4, a detail exterior view of an example insulator support pin 202 is illustrated. The insulator support pin 202 is intended to at least one of reduce or eliminate the amount of leakage current (not shown in FIG. 4) that can be conducted through the insulator support pin 202 compared to known insulator support pins. The insulator support pin 202 extends between a first end 400 and a second end 402. The first end 400 is configured to attach to the insulator 110 (not shown in FIG. 4). The structure enabling the first end 400 to attach to the insulator 110 can include any suitable structure. In the shown example, the first end 400 includes a threaded engagement portion 404 that can be threadingly engaged to the insulator 110. In some examples, the threaded engagement portion 404 can include relatively coarse threads in order to minimize the amount of turns an operator would apply to the insulator 110 to attach it to the insulator support pin 202. Of course, other attachment structures and methods are also contemplated, including, but not limited to, press fits, snap-on fits, clips, set screws, etc. In some examples, the threaded engagement portion 404 is non-conductive. In some examples, the threaded engagement portion 404 is in direct contact with the insulator 110. In some examples, the threaded engagement portion 404 is both non-conductive and in direct contact with the insulator 110.

Similarly, the second end 402 of the insulator support pin 202 is configured to attach the insulator support pin 202 to a support structure such as the crossarm 106 (not shown in FIG. 4. The structure enabling the second end 402 to attach to the crossarm 106 can include any suitable structure. In the shown example, the second end 402 includes a threaded engagement portion 406. In some examples, the insulator support pin 202 can extend through an aperture defined by the crossarm 106, and the threaded engagement portion 406 can be threadingly engaged to a threaded nut (not shown in FIG. 4) on an underside of the crossarm 106. In some examples, the threaded engagement portion 406 can be screwed directly into the crossarm 106. Of course, other attachment structures and methods are also contemplated, including, but not limited to, press fits, snap-on fits, clips, separate screws, etc., and the shown example of attachment is not meant to be limiting. In some examples, the threaded engagement portion 406 is non-conductive. In some examples, the threaded engagement portion 406 is in direct contact with the support structure such as the crossarm 106 or the pole 104. In some examples, the threaded engagement portion 406 is both non-conductive and in direct contact with the support structure.

The insulator support pin 202 also includes a support member 408 between the first end 400 and the second end 402. The support member 408 can have a diameter 410 that is greater than a diameter 412 of the insulator support pin 202. This differential of diameters can enable a portion 414 of the insulator support pin 202 to be inserted into the aperture defined by the crossarm 106 while preventing another portion 416 of the insulator support pin 202 from passing into the aperture. Additionally, the support member 408 can include a lower surface 418 configured to contact an upper surface 204 (shown in FIG. 2) of the crossarm 106 when the insulator support pin 202 is placed into the aperture of the crossarm 106. This contact between the lower surface 418 and the upper surface 204 provides a physical interference to limit the distance of insertion of the insulator support pin 202 into the aperture.

In some examples, the support member 408 can have a frusto-conical shape, however, other shapes are also contemplated and can include a cylinder having a larger diameter than the diameter 412 of the insulator support pin 202. In some examples, the support member 408 can include a tapered sidewall 420. Other examples can include an arm that extends from the outer surface of the insulator support pin 202. Further examples can include a series of protrusions located about the circumference of the insulator support pin 202. In some examples, the support member 408 is an integral part of an exterior layer of the insulator support pin 202. In some examples, the support member 408 is separately attached to the insulator support pin 202. In some examples, the support member 408 is non-conductive to at least one of reduce or eliminate conduction of the leakage current 300 from the insulator 110 to the crossarm 106 (or the pole 104).

By limiting the distance of insertion of the insulator support pin 202 into the aperture defined by the crossarm 106, the support member 408 can also set the distance 200 (shown in FIG. 2) between the insulator 110 and the crossarm 106 (or the pole 104). As noted previously, the distance 200 can be properly calculated during a design/engineering process and set during an assembly process to help limit the amount of leakage current that may pass from the electrical conductor 102 to the crossarm 106 or the pole 104, or from the insulator 110 to the crossarm 106. It is to be appreciated that the insulator support pin 202 as shown in FIG. 4 can be a single, unitary piece or constructed of several pieces as an assembly. Each of any of the components of the insulator support pin 202 can be non-conductive in order to at least one of reduce or eliminate passage of the leakage current 300. For example, passage of the leakage current 300 from the insulator 110 onto the crossarm 106 or passage of the leakage current 300 from the insulator 110 onto the pole 104.

Figure 5:
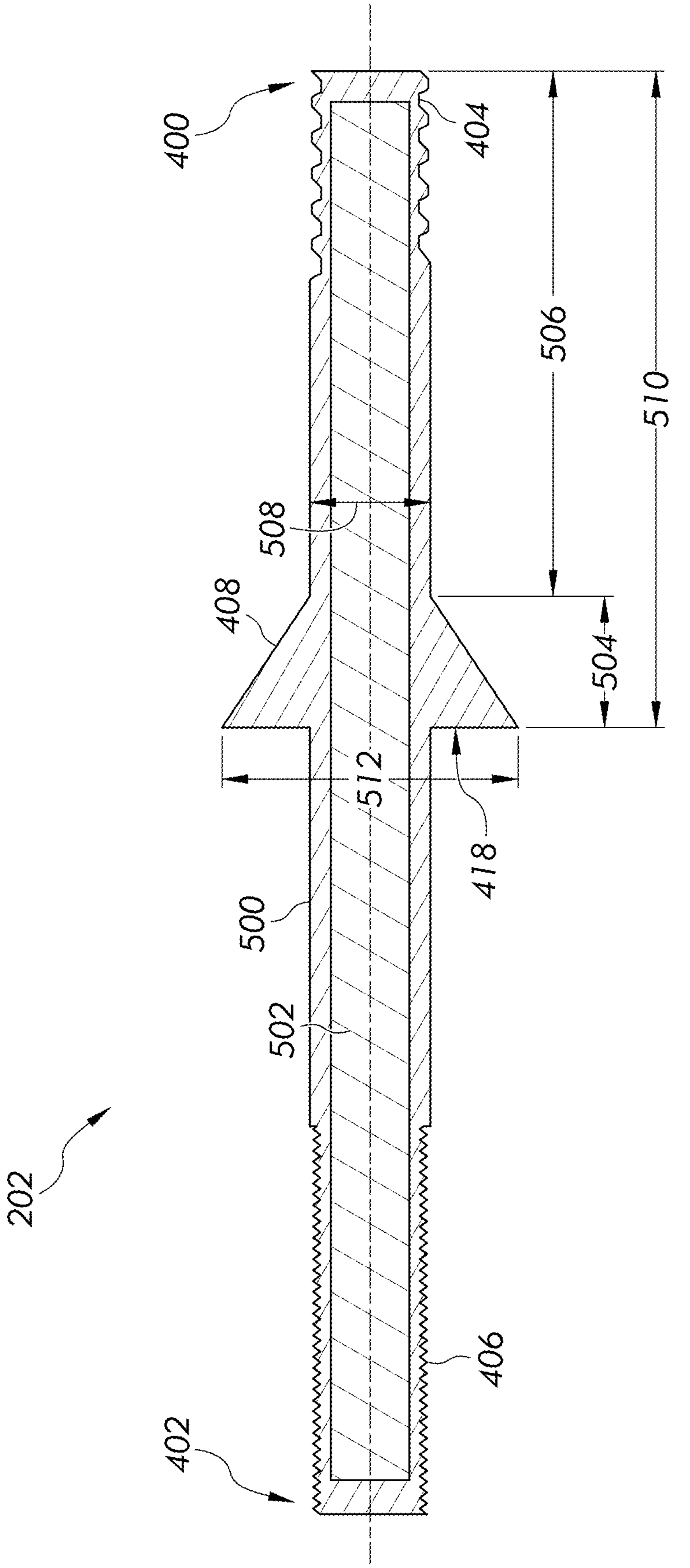
FIG. 5 is a cross-section view taken along line 5-5 of FIG. 4.

Referring to FIG. 5, a cross-section view of an example insulator support pin 202 taken along line 5-5 of FIG. 4 is illustrated. The insulator support pin 202 can include a non-conductive sheath 500 that forms the exterior or an exterior layer of the insulator support pin 202. Any suitable materials can be used to construct the non-conductive sheath 500. Additionally, the non-conductive sheath 500 surrounds a strength member 502 located within the insulator support pin 202. In some examples, the strength member 502 can be constructed of a material possessing a greater stiffness than a material that forms the non-conductive sheath 500. In this way, the insulator support pin 202 can benefit from the strength of traditionally used materials (e.g., metals) while maintaining non-conductive physical properties by covering the strength member 502 with the non-conductive sheath 500 including one or more materials that are non-conductive but may be less sturdy in comparison to the strength member 502. In some examples, the strength member 502 possesses physical properties to render the strength member 502 non-conductive, meaning not electrically conductive. For example, the strength member 502 can be constructed of materials including, but not limited to, a fiberglass material or an epoxy material. In some examples, the non-conductive sheath 500 is over-molded around the strength member 502. The over-molded material forming the non-conductive sheath 500 can be constructed of materials including, but not limited to, a relatively hard plastic material.

In some examples, the support member 408 spans a length 504 of the non-conductive sheath 500 between the first end 400 and the second end 402. At a first distance 506 from the first end 400 of the non-conductive sheath 500, the support member 408 has a first width 508. At a second distance 510 from the first end 400 of the non-conductive sheath 500, the support member 408 has a second width 512, and this second width 512 is different than (e.g., not equal to) the first width 508. As shown the first distance 506 is different than (e.g., not equal to) the second distance 510. While discussed in regard to the example insulator support pin 202 of FIG. 5, the described relationship of distances and widths can be applied to all of the examples of the present disclosure. In some examples, such as the example shown in FIG. 5, the non-conductive sheath 500 can be a single, unitary piece.

As discussed previously, the second distance 510, among other dimensions of the insulator support pin 202, can be designed and manufactured to set a particular distance 200 (shown in FIG. 2) that can be calculated to reduce or eliminate the passage of leakage current from the insulator 110 to the crossarm 106 and from the insulator 110 to the pole 104. Furthermore, the distance 200 can also be calculated and designed to account for (e.g., minimize the effects of) a reduced magnitude of insulative properties of the insulator support pin 202 resulting from contamination accumulation on the insulator 110. When the insulator support pin 202 is attached to the support structure (e.g., the crossarm 106 or the pole 104), the surface 418 cooperates with a top surface of the crossarm 106 or the pole 104. The first end 400 attaches to the insulator 110 (not shown in FIG. 5), and, thus, a magnitude of the second distance 510 will affect the position of insulator 110 relative to the crossarm 106 or the pole 104. It is to be appreciated that an increase in the magnitude of the second distance 510 will increase a magnitude of the distance 200. Similarly, a decrease in the magnitude of the second distance 510 will decrease the magnitude of the distance 200.

Figure 6:
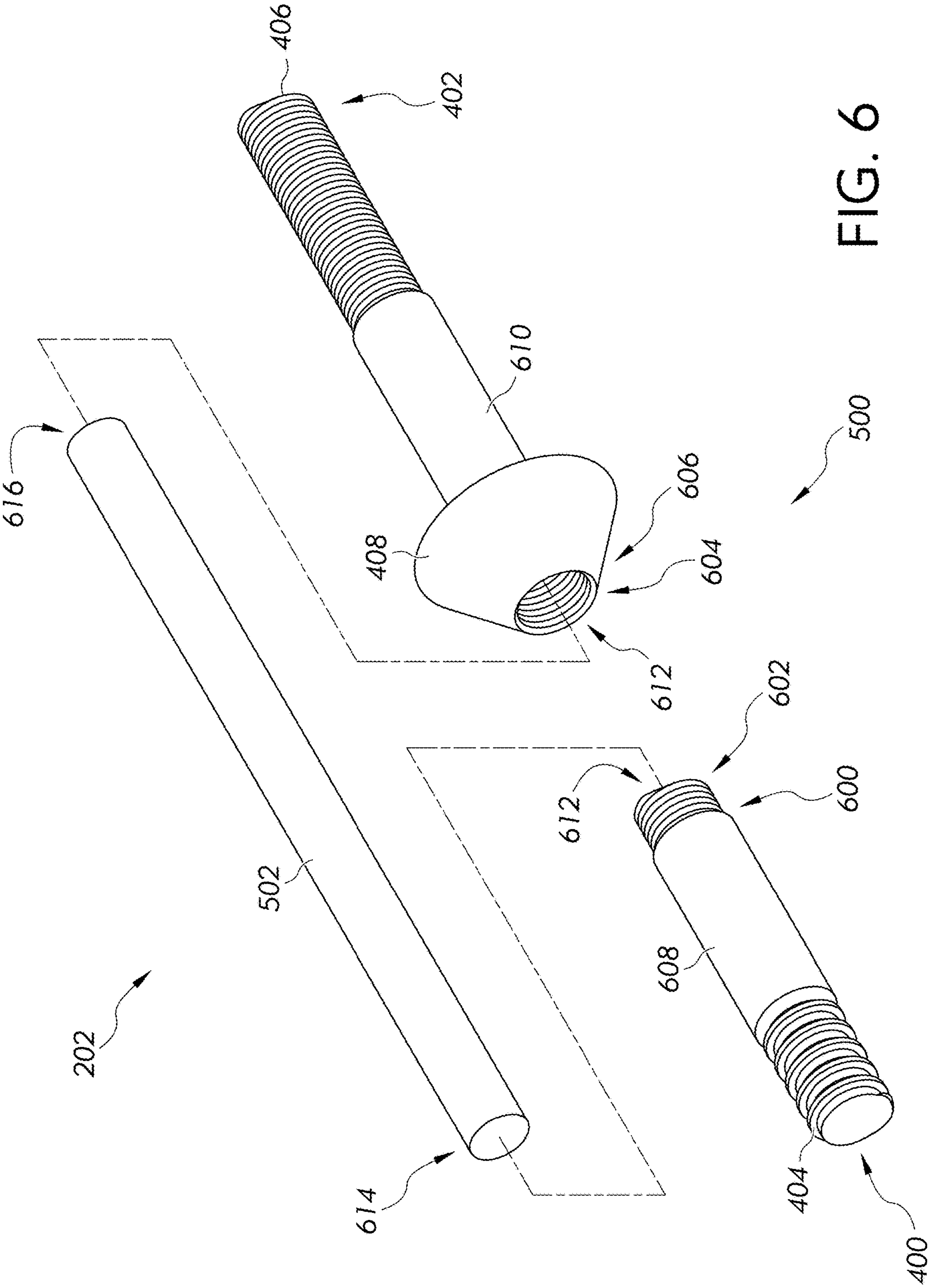
FIG. 6 is an exploded view of an example insulator support pin.

Referring to FIG. 6, the non-conductive sheath 500 can be assembled from two or more pieces. For example, at a first location 600 between the first end 400 and the second end 402, the non-conductive sheath 500 has a first mating portion 602. At a second location 604 between the first end 400 and the second end 402, the non-conductive sheath 500 has a second mating portion 606. The first mating portion 602 and the second mating portion 606 mate with one another to couple a first portion 608 of the non-conductive sheath 500 to a second portion 610 of the non-conductive sheath 500. As illustrated, the first mating portion 602 and the second mating portion 606 can include threaded features such that the first portion 608 of the non-conductive sheath 500 and the second portion 610 of the non-conductive sheath 500 can be threaded or screwed together in order to be mated or coupled together. Of course, any suitable attachment structures and methods can be employed with the described multiple-part non-conductive sheath 500. Additionally, in some examples, the insulator support pin 202 does not require inclusion of the support member 408.

It is to be appreciated that the first portion 608 of the non-conductive sheath 500 extends between and includes the first end 400 of the non-conductive sheath 500 and the first mating portion 602. Additionally, the second portion 610 of the non-conductive sheath 500 extends between and includes the second end 402 of the non-conductive sheath 500 and the second mating portion 606. As shown, the non-conductive sheath 500 defines a void 612. In some examples, the void 612 is formed by two blind holes, one hole in each of the first portion 608 and the second portion 610. The void 612 enables the strength member 502 to be removable from the non-conductive sheath 500 through the void 612. Additionally, the void 612 enables the strength member 502 to be insertable into the non-conductive sheath 500 through the void 612. In some examples, when the first portion 608 of the non-conductive sheath 500 and the second portion 610 of the non-conductive sheath 500 are mated together, the void 612 defined by the first portion 608 is coaxial with the void 612 defined by the second portion 610 such that the void 612 is continuous from the interior of the first portion 608 to the interior of the second portion 610.

When the first mating portion 602 and the second mating portion 606 are not mated with one another as shown in FIG. 6, the strength member 502 can be placed into both the first portion 608, the second portion 610, or both the first portion 608 and the second portion 610 at the same time, such as in an assembly process. Additionally, the strength member 502 can be located in one or both of the first portion 608 and the second portion 610 and is removable from at least one of the first portion 608 or the second portion 610 if the individual components of the insulator support pin 202 should ever need to be disassembled.

Similarly, the strength member 502 can be insertable into the void 612 of at least one of the first portion 608 of the non-conductive sheath 500 or the second portion 610 of the non-conductive sheath 500. Of course, the strength member 502 can be insertable into both the first portion 608 and the second portion 610 at once through the void 612. As an example, a first end 614 of the strength member 502 can be placed into and removed from the void 612 defined by the first portion 608 of the non-conductive sheath 500. The second end 616 of the strength member 502 can be placed into and removed from the void 612 defined by the second portion 610 of the non-conductive sheath 500. In other words, the strength member 502 can be located within only one of the first portion 608 or the second portion 610, or (as shown) the strength member 502 can be located within both the first portion 608 and the second portion 610.

Figure 7:
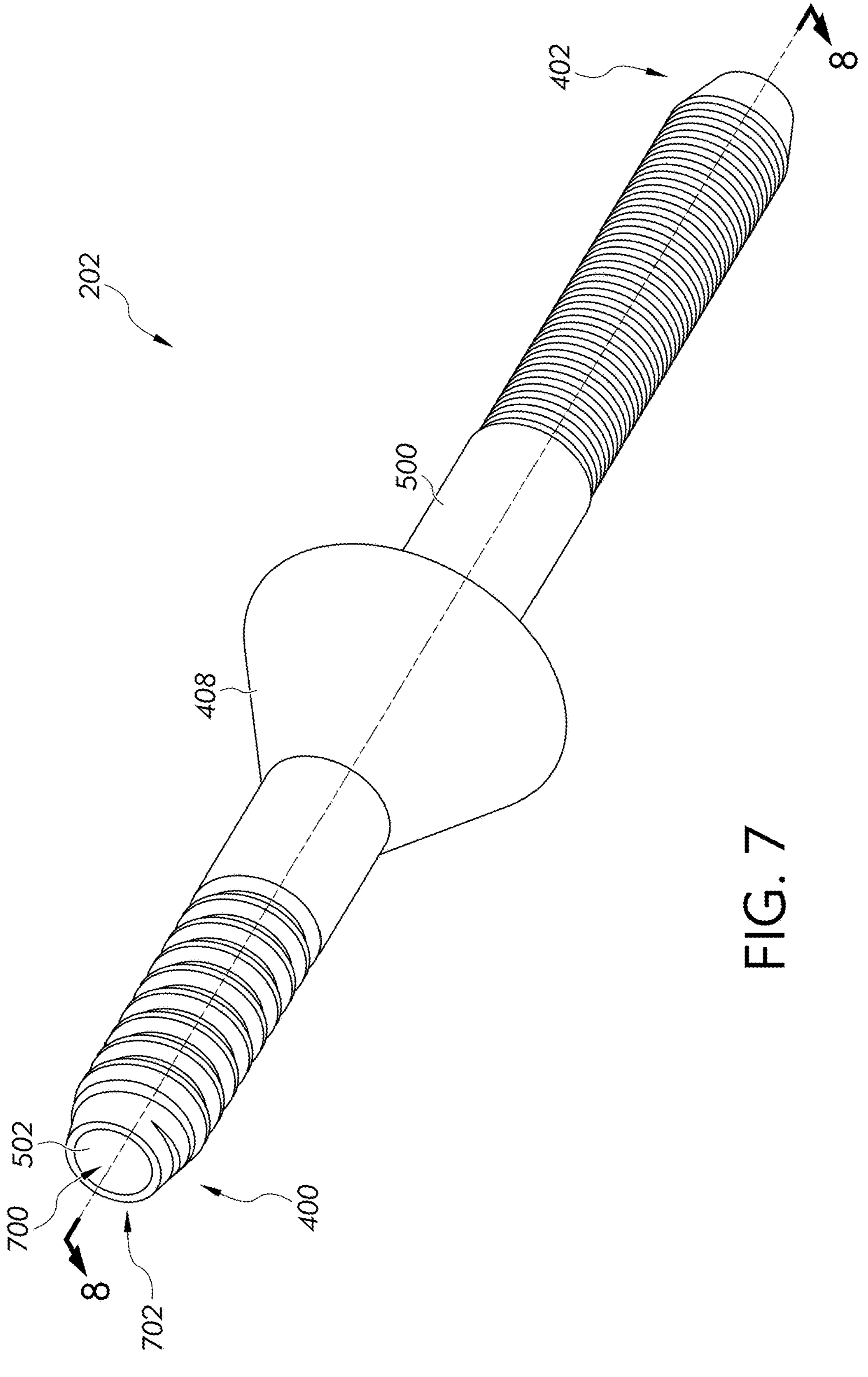
FIG. 7 illustrates an example insulator support pin.

Referring to FIG. 7, the insulator support pin 202 can include a non-conductive sheath 500 surrounding the strength member 502. For the purposes of this disclosure, the term "surrounding," at least in reference to the non-conductive sheath 500 and the strength member 502, can include the non-conductive sheath 500 completely enveloping the strength member 502. Additionally, the term "surrounding" can also be understood as the non-conductive sheath 500 covering at least a portion of the strength member 502. As such, there may be examples of the insulator support pin 202 wherein the strength member 502 is at least partially exposed to a space located on an exterior of the insulator support pin 202 with respect to the strength member 502. As in previous examples, the non-conductive sheath 500 extends from the first end 400 to the second end 402. Also as in previous examples, the first end 400 is configured to attach to the insulator 110 (not shown in FIG. 7) and the second end 402 is configured to attach to the support structure (e.g., the crossarm 106 or the pole 104, not shown in FIG. 7).

In the shown example, the non-conductive sheath 500 defines a void 700 whereby the strength member 502 is removable from the non-conductive sheath 500 through the void 700. Additionally, the strength member 502 can be removable from the non-conductive sheath 500 through the void 700. In the shown example, the non-conductive sheath 500 defines the void 700 and an aperture 702 located at the first end 400. As such, in some examples, the void 700 can be defined as a blind hole that is open to the first end 400 rather than an opening at a central portion of the insulator support pin 202 as shown in FIG. 6.

In order to reduce the electrical conductivity of the insulator support pin 202, the strength member 502 can be composed of materials having physical properties rendering the strength member 502 to be non-conductive. Additionally, the void 700 is defined at the first end 400 of the non-conductive sheath 500 such that the void 700 and the aperture 702 are covered by the insulator 110 (not shown in FIG. 7) when the first end 400 is attached to the insulator 110. As noted previously, the first end 400 can define a threaded engagement portion 404 enabling the first end 400 to be threadingly engaged with the insulator 110. Other attachment structures and methods are also contemplated.

Figure 8:
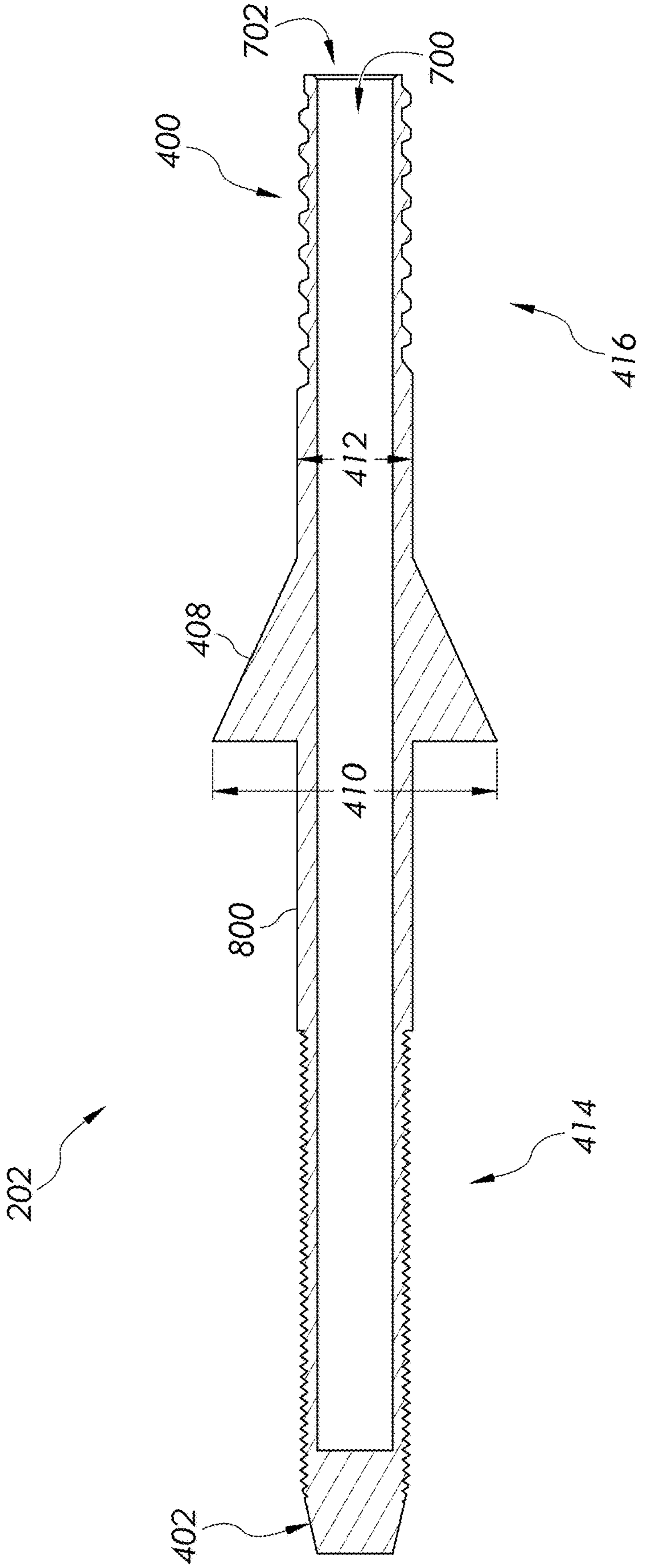
FIG. 8 is a cross-section view taken along line 8-8 of FIG. 7.

Referring to FIG. 8, a cross-section view of the insulator support pin 202 taken along line 8-8 of FIG. 7 is illustrated without the strength member 502 to show the void 700. As discussed with previous examples of the insulator support pin 202, the insulator support pin 202 can include the support member 408 between the first end 400 and the second end 402. The support member 408 can have a diameter 410 that is greater than a diameter 412 of the insulator support pin 202. In other words, the support member 408 can extend away from an exterior surface 800 of the insulator support pin 202. This differential of diameters can enable a portion 414 of the insulator support pin 202 to be inserted into the previously described aperture defined by the crossarm 106 (not shown in FIG. 8) while preventing another portion 416 of the insulator support pin 202 from passing into the aperture. As shown, the support member 408 can be an integral portion of the non-conductive sheath 500. Additionally, the support member 408 can be constructed of materials that render the support member 408 non-conductive.

Figure 9:
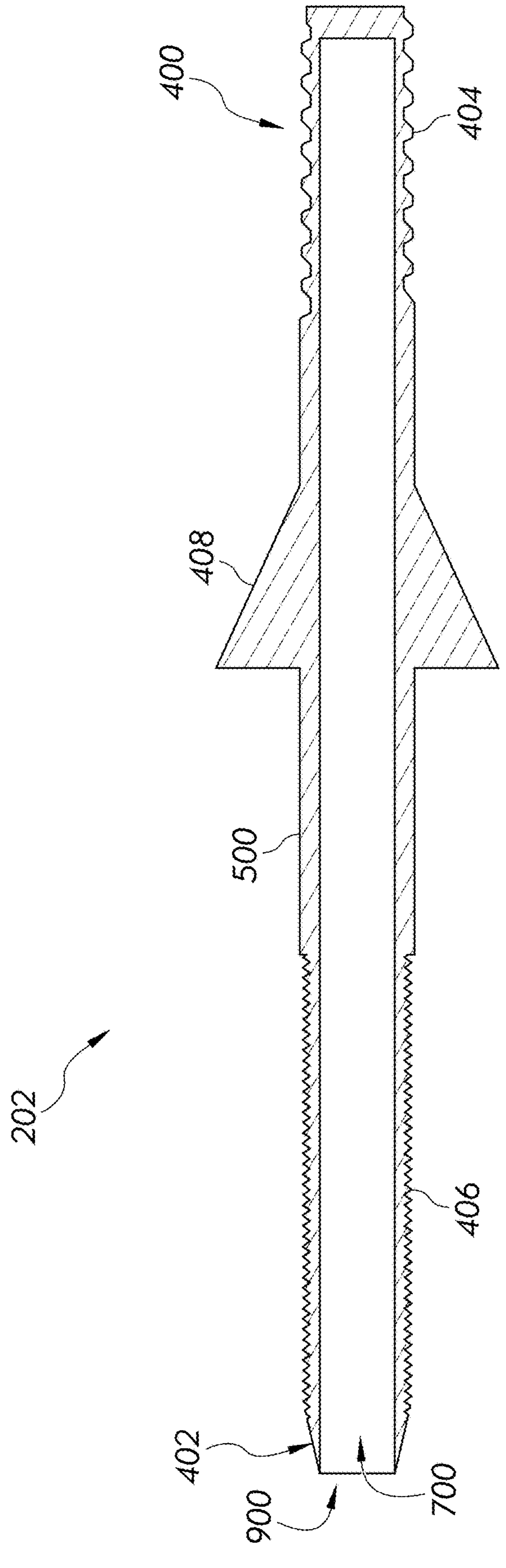
FIG. 9 is a cross-section view of an example insulator support pin.

Referring to FIG. 9, a cross-section view of the insulator support pin 202 is illustrated. In some examples, insulator support pin 202 can define the void 700 so as to be open to an aperture 900 at the second end 402 such that the non-conductive sheath 500 defines the void 700 as a blind hole that is open only to the second end 402. Additionally, the void 700 is defined at the second end 402 of the non-conductive sheath 500 such that the void 700 and the aperture 900 are covered by the support structure (e.g., the crossarm 106 or the pole 104) (not shown in FIG. 9) when the second end 402 is attached to the support structure. As noted previously, the second end 402 can define a threaded engagement portion 406 enabling the second end 402 to be threadingly engaged to the support structure or a mechanical nut or similar structures. As with previous descriptions, other attachment structures and methods are also contemplated.

In yet other examples, the insulator support pin 202 can define the void 700 to be in communication with both the described aperture 702 (shown in FIG. 8) at the first end 400 and the described aperture 900 at the second end 402. In these examples, the void 700 is defined as a through-hole extending from the first end 400 of the insulator support pin 202 to the second end 402 of the insulator support pin 202.

In some examples, the strength member 502 (not shown in FIG. 9) can be press-fit into the void 700 to provide a relatively solid structure that is relatively difficult to disassemble the strength member 502 from the non-conductive sheath 500. Of course, dimensional slip fits, and other methods of insertion of the strength member 502 can be used in conjunction with the devices of the present disclosure.

FIGS. 6-9 illustrate various combinations of tapered and non-tapered first end 400 and second end 402 configurations. In some examples, the presence of a tapered configuration on the first end 400 or the second end 402 can aid an operator or line worker by reducing the effort needed to properly locate the insulator support pin 202 with respect to at least one of the insulator 110, the crossarm 106, or the pole 104. In other words, the tapered configuration can make the task of threading the insulator support pin 202 to another object relatively easy.

Figure 10:
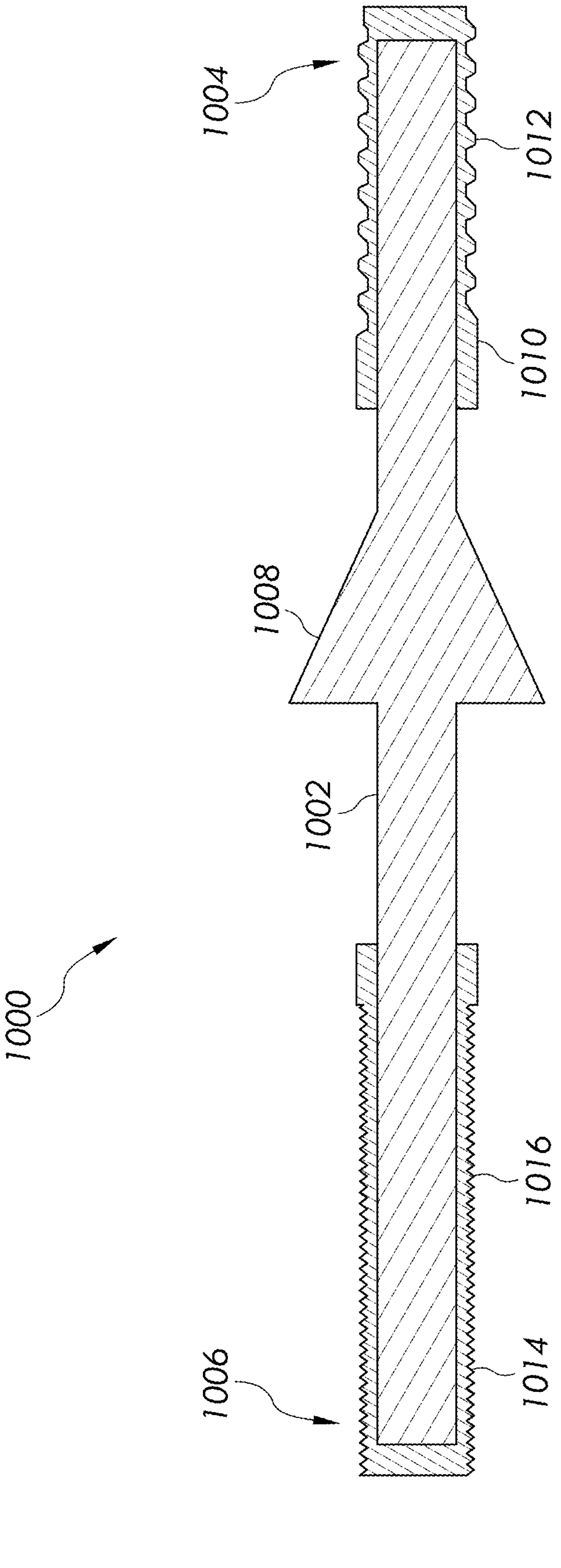
FIG. 10 is a cross-section view of an example insulator support pin.

Referring to FIG. 10, a cross-section view of an example insulator support pin 1000 is illustrated. In some examples, the insulator support pin 1000 includes a non-conductive strength member 1002 extending between a first end 1004 and a second end 1006, similar to previously described examples. In some examples, the strength member 1002 can be constructed of materials including, but not limited to, a fiberglass material or an epoxy material. A support member 1008 can extend from the non-conductive strength member 1002. In some examples, the support member 1008 is the same as or similar to the previously described support member 408. Additionally, the support member 1008 can be unitary with the non-conductive strength member 1002.

As shown, the insulator support pin 1000 can include a first attachment feature 1010 at the first end 1004 configured to attach to the insulator 110 (not shown in FIG. 9). For example, the first attachment feature 1010 can be crimped or otherwise attached to the non-conductive strength member 1002 to provide an attachment feature such as a threaded structure 1012. In some examples, the first attachment feature 1010 is conductive, and in some examples, the first attachment feature 1010 is non-conductive.

As shown, the insulator support pin 1000 can include a second attachment feature 1014 at the second end 1006 configured to attach to the support member (not shown in FIG. 9) (e.g., crossarm 106 or the pole 104). For example, the second attachment feature 1014 can be crimped or otherwise attached to the non-conductive strength member 1002 to provide an attachment feature such as a threaded structure 1016. In some examples, the second attachment feature 1014 is conductive, and in some examples, the second attachment feature 1014 is non-conductive.

It is to be appreciated that any suitable structure or attachment method to attach the first attachment feature 1010 and attach the second attachment feature 1014 to the non-conductive strength member 1002 is satisfactory. Regardless of the structure or attachment method utilized, certain benefits can be gained by ensuring the attachment can meet performance expectations through an anticipated length of service life of the insulator support pin 1000.

Figure 11:
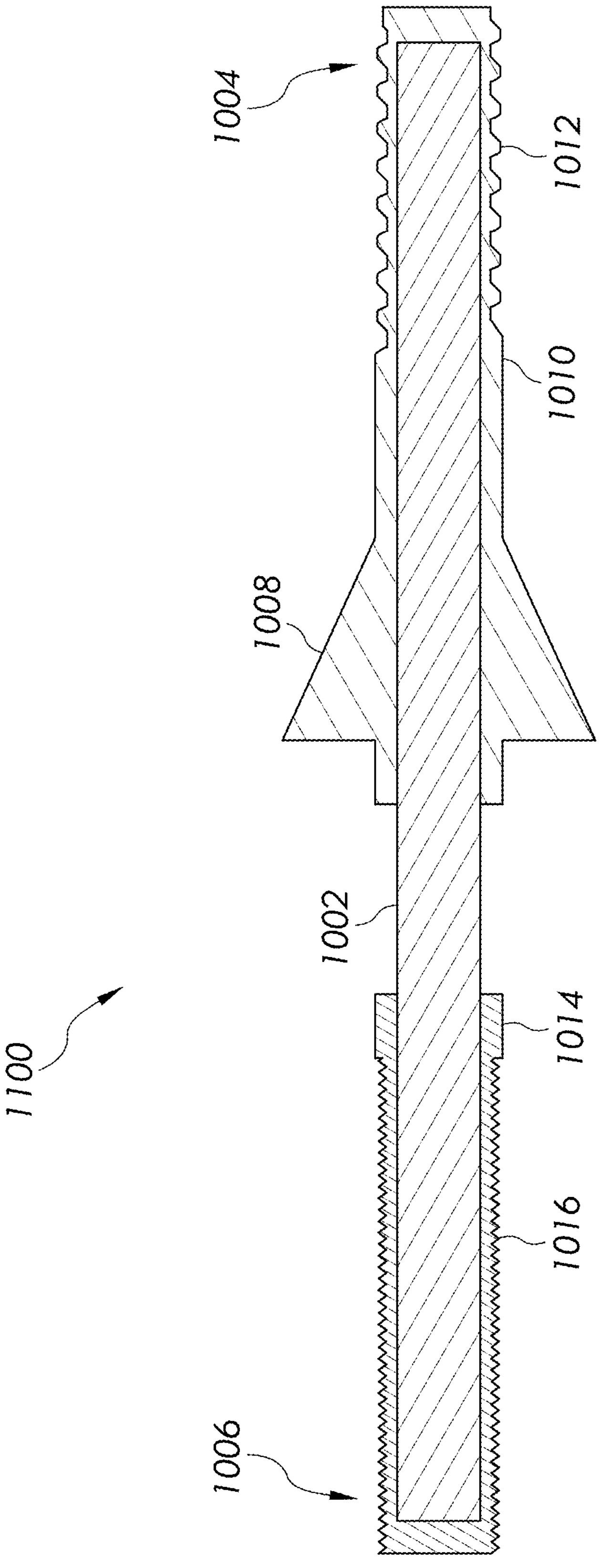
FIG. 11 is a cross-section view of an example insulator support pin.

Referring to FIG. 11, a cross-section view of another example insulator support pin 1100 is illustrated. As shown, in some examples, the support member 1008 can extend from the first attachment feature 1010. In some examples, the support member 1008 can be integral or unitary with the first attachment feature 1010. In some examples, the support member 1008 can be composed of a different material than the first attachment feature 1010 and the support member 1008 can be separately attached to the first attachment feature 1010.

Figure 12:
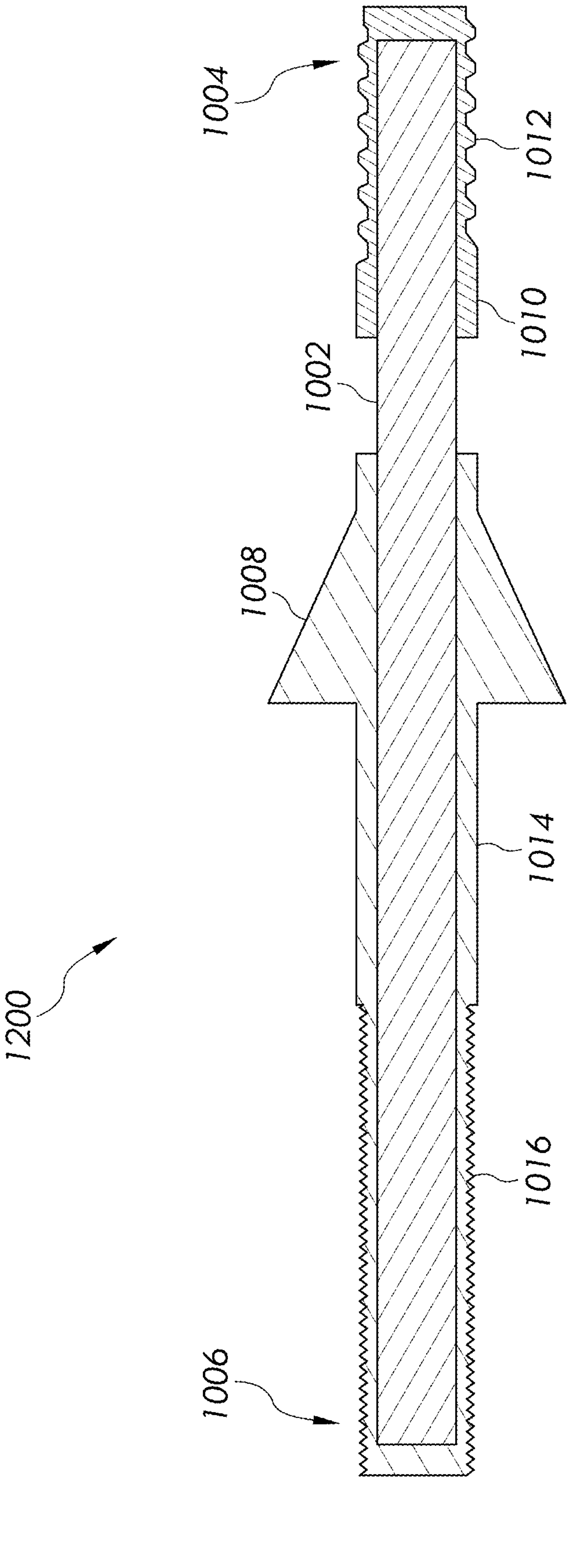
FIG. 12 is a cross-section view of an example insulator support pin.

Referring to FIG. 12, a cross-section view of another example insulator support pin 1200 is illustrated. As shown, in some examples, the support member 1008 can extend from the second attachment feature 1014. In some examples, the support member 1008 can be integral with the second attachment feature 1014. In some examples, the support member 1008 can be composed of a different material than the second attachment feature 1014 and the support member 1008 can be separately attached to the second attachment feature 1014.

The apparatus and methods of the present disclosure can provide several benefits. For example, the described examples of the insulator support pin can reduce or eliminate at least one of the magnitude or the number of occurrences of leakage current from passing from a conductor to a support structure. Additionally, the described examples can eliminate or reduce heating and drying of wooden support structures such as poles and crossarms as leakage currents passed from conductors to conductive pins or fasteners within the support structure. Also, the described insulator support pins and methods can help reduce the likelihood of wooden support members being ignited in dry and heated conditions and potentially spreading fire to nearby vegetation that may also be dry. In some cases, the described structures can reduce the number of and frequency of ignition sources of brush fires and forest fires.

Additionally, the apparatus and methods of the present disclosure can increase an insulative distance between the insulator and the crossarm. Use of a non-conductive insulator support pin can increase the insulative distance by the length of the insulator support pin above the crossarm. As contamination builds on the insulator, the insulator support pin remains relatively shielded from the contamination. As the insulative path is broken down, the insulator support pin provides additional distance to help prevent leakage current passing from the insulator to the crossarm or the pole and ultimately to the through-bolt.

It is worthy of note that the apparatus and methods have been described in reference to wood support structures (e.g., crossarms and poles), but the described insulator support pins can also apply to support structures composed of metal or other materials.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An insulator support pin comprising:

a strength member;

a non-conductive sheath surrounding the strength member and extending between a first end and a second end, with the non-conductive sheath having a bore at the second end, with the first end of the non-conductive sheath encapsulating a respective segment of the strength member such that the strength member terminates within the bore so as to not extend beyond the first end of the non-conductive sheath; and a support member between the first end and the second end, wherein:

the first end of the non-conductive sheath, with the respective segment of the strength member encapsulated therein, is configured to attach to an insulator, and the second end of the non-conductive sheath is configured to attach to a support structure.

2. The insulator support pin of claim 1, wherein the strength member is non-conductive.

3. The insulator support pin of claim 1, wherein the support member has a tapered sidewall.

4. The insulator support pin of claim 1, wherein:

at a first distance from the first end of the non-conductive sheath the support member has a first width, at a second distance from the first end of the non-conductive sheath the support member has a second width, the first distance is different than the second distance, and the first width is different than the second width.

5. The insulator support pin of claim 1, wherein at least one of:

the first end of the non-conductive sheath is configured to threadingly attach to the insulator; or the second end of the non-conductive sheath is configured to threadingly attach to the support structure.

6. The insulator support pin of claim 1, wherein:

at a first location between the first end and the second end, the non-conductive sheath has a first mating portion, at a second location between the first end and the second end, the non-conductive sheath has a second mating portion, the first mating portion and the second mating portion mate with one another to couple a first portion of the non-conductive sheath to a second portion of the non-conductive sheath, the first portion of the non-conductive sheath extends between and includes the first end of the non-conductive sheath and the first mating portion, the second portion of the non-conductive sheath extends between and includes the second end of the non-conductive sheath and the second mating portion, and when the first mating portion and the second mating portion are not mated with one another, the strength member is at least one of removable from or insertable into at least one of the first portion of the non-conductive sheath or the second portion of the non-conductive sheath.

7. The insulator support pin of claim 1, wherein the bore is a blind-end bore.

8. An insulator support pin comprising a strength member; and a non-conductive sheath surrounding the strength member and extending between a first end and a second end, with the non-conductive sheath defining a bore, with the first end of the non-conductive sheath encapsulating a respective segment of the strength member such that the strength member terminates within the bore so as to not extend beyond the first end of the non-conductive sheath, wherein: the first end of the non-conductive sheath, with the respective segment of the strength member encapsulated therein, is configured to attach to an insulator, the second end of the non-conductive sheath is configured to attach to a support structure, at a first location between the first end and the second end, the non-conductive sheath has a first mating portion, at a second location between the first end and the second end, the non-conductive sheath has a second mating portion and a void is defined at at least one of the first location or the second location, the first mating portion and the second mating portion mate with one another to couple a first portion of the non-conductive sheath to a second portion of the non-conductive sheath, the first portion of the non-conductive sheath extends between and includes the first end of the non-conductive sheath and the first mating portion, the second portion of the non-conductive sheath extends between and includes the second end of the non-conductive sheath and the second mating portion, and when the first mating portion and the second mating portion are not mated with one another, the strength member is at least one of removable from or insertable into at least one of the first portion of the non-conductive sheath or the second portion of the non-conductive sheath.

9. The insulator support pin of claim 8, wherein the strength member is non-conductive.

10. The insulator support pin of claim 8, comprising a non-conductive support member extending from the non-conductive sheath between the first end and the second end, wherein:

at a first distance from the first end of the non-conductive sheath the non-conductive support member has a first width, at a second distance from the first end of the non-conductive sheath the non-conductive support member has a second width, the first distance is different than the second distance, and the first width is different than the second width.

11. The insulator support pin of claim 8, comprising a non-conductive support member extending from the non-conductive sheath between the first end and the second end, wherein the non-conductive support member has a tapered sidewall.

12. An insulator support pin comprising:

a strength member; and a non-conductive sheath surrounding the strength member and extending between a first end and a second end, with the non-conductive sheath having a bore at the second end, with the first end of the non-conductive sheath encapsulating a respective segment of the strength member such that the strength member terminates within the bore so as to not extend beyond the first end of the non-conductive sheath, wherein at least one of:

the first end of the non-conductive sheath, with the respective segment of the strength member encapsulated therein, is threadingly configured to attach to an insulator, or the second end of the non-conductive sheath is threadingly configured to attach to a support structure.

13. The insulator support pin of claim 12, wherein the strength member is non-conductive.

14. The insulator support pin of claim 12, wherein the first end of the non-conductive sheath is configured to threadingly attach to the insulator and the second end of the non-conductive sheath is configured to threadingly attach to the support structure.

15. The insulator support pin of claim 12, wherein the bore is a blind-end bore.

16. The insulator support pin of claim 12, comprising a non-conductive support member extending from the non-conductive sheath between the first end and the second end.

17. The insulator support pin of claim 15, wherein the first end of the non-conductive sheath is configured to threadingly attach to the insulator and the second end of the non-conductive sheath is configured to threadingly attach to the support structure.

18. An insulator support pin comprising:

a non-conductive strength member extending between a first end and a second end;

a first attachment feature at the first end configured to threadingly attach to an insulator;

a second attachment feature at the second end configured to threadingly attach to a support structure, wherein a bore is defined in the first attachment feature and the second attachment feature such that the non-conductive strength member disposed in the first attachment feature and the second attachment feature terminates within the bore so as to not extend beyond the first end; and a support member extending from at least one of:

the first attachment feature, or the second attachment feature.

19. The insulator support pin of claim 18, wherein at least one of:

the first attachment feature is non-conductive; or the second attachment feature is non-conductive.

20. The insulator support pin of claim 18, wherein the bore is a blind-end bore.

* * * * *